United States Patent
Ungermann

(10) Patent No.: US 11,408,507 B2
(45) Date of Patent: Aug. 9, 2022

(54) PISTON FOR AN INTERNAL COMBUSTION ENGINE

(71) Applicant: FEDERAL-MOGUL NURNBERG GMBH, Nuremberg (DE)

(72) Inventor: Sven Ungermann, Nuremberg (DE)

(73) Assignee: Federal-Mogul Nurnberg GmbH, Nuremberg (DE)

(*) Notice: Subject to any disclaimer, the term of this patent is extended or adjusted under 35 U.S.C. 154(b) by 0 days.

(21) Appl. No.: 15/734,748

(22) PCT Filed: Jul. 9, 2019

(86) PCT No.: PCT/EP2019/068359
§ 371 (c)(1),
(2) Date: Dec. 3, 2020

(87) PCT Pub. No.: WO2020/011767
PCT Pub. Date: Jan. 16, 2020

(65) Prior Publication Data
US 2021/0239214 A1 Aug. 5, 2021

(30) Foreign Application Priority Data
Jul. 10, 2018 (DE) ..................... 10 2018 211 361.0

(51) Int. Cl.
*F02F 3/00* (2006.01)
*F16J 9/20* (2006.01)

(52) U.S. Cl.
CPC ................. *F16J 9/206* (2013.01); *F02F 3/00* (2013.01)

(58) Field of Classification Search
CPC ........... F16J 1/09; F16J 1/08; F01M 2001/083

USPC ....................................................... 123/193.4
See application file for complete search history.

(56) References Cited

U.S. PATENT DOCUMENTS

| | | | | |
|---|---|---|---|---|
| 2,511,458 A * | 6/1950 | Bramberry, Sr. | ........ | F16J 9/206 92/160 |
| 7,406,941 B2 * | 8/2008 | Zhu | ............................ | F16J 1/09 123/193.6 |
| 8,220,432 B2 * | 7/2012 | Iwata | ........................ | F02F 3/00 123/193.6 |
| 2007/0272078 A1 | 11/2007 | Yamada et al. | | |
| 2008/0314241 A1 * | 12/2008 | Buschbeck | ................ | F16J 1/09 92/222 |
| 2009/0020007 A1 | 1/2009 | Lin et al. | | |

(Continued)

FOREIGN PATENT DOCUMENTS

| | | |
|---|---|---|
| CN | 105422306 A | 3/2016 |
| CN | 206830319 U | 1/2018 |

(Continued)

OTHER PUBLICATIONS

International Search Report, dated Sep. 13, 2019 (PCT/EP2019/068359).

*Primary Examiner* — Long T Tran
*Assistant Examiner* — James J Kim
(74) *Attorney, Agent, or Firm* — Robert L. Stearns; Dickinson Wright, PLLC

(57) ABSTRACT

A piston (10) for an internal combustion engine includes a groove (16) for an oil wiper ring and a recess (18) between the groove (16) and at least one shaft wall (20). A lower edge of the groove (16), which is closer to the shaft wall (20), has a larger diameter than a lower edge of the recess (18).

10 Claims, 1 Drawing Sheet

(56) References Cited

U.S. PATENT DOCUMENTS

| | | | | |
|---|---|---|---|---|
| 2009/0151688 A1* | 6/2009 | Matsui | ............ | F02F 3/22 |
| | | | | 92/186 |
| 2013/0008307 A1* | 1/2013 | Will | ............ | F02F 3/26 |
| | | | | 92/172 |
| 2014/0076264 A1 | 3/2014 | Matsuo | | |
| 2015/0075456 A1* | 3/2015 | Weinenger | ............ | F16J 1/09 |
| | | | | 123/41.37 |
| 2016/0169150 A1* | 6/2016 | Freidhager | ............ | F02F 3/0076 |
| | | | | 123/193.6 |
| 2016/0305362 A1 | 10/2016 | Wandrie, III | | |
| 2017/0350344 A1* | 12/2017 | Oso | ............ | F02F 3/10 |
| 2020/0088128 A1* | 3/2020 | Suda | ............ | F16J 1/04 |

FOREIGN PATENT DOCUMENTS

| | | |
|---|---|---|
| DE | 102005041908 A1 | 3/2007 |
| DE | 102011075673 A1 | 11/2012 |

* cited by examiner

Fig. 1
Fig. 2
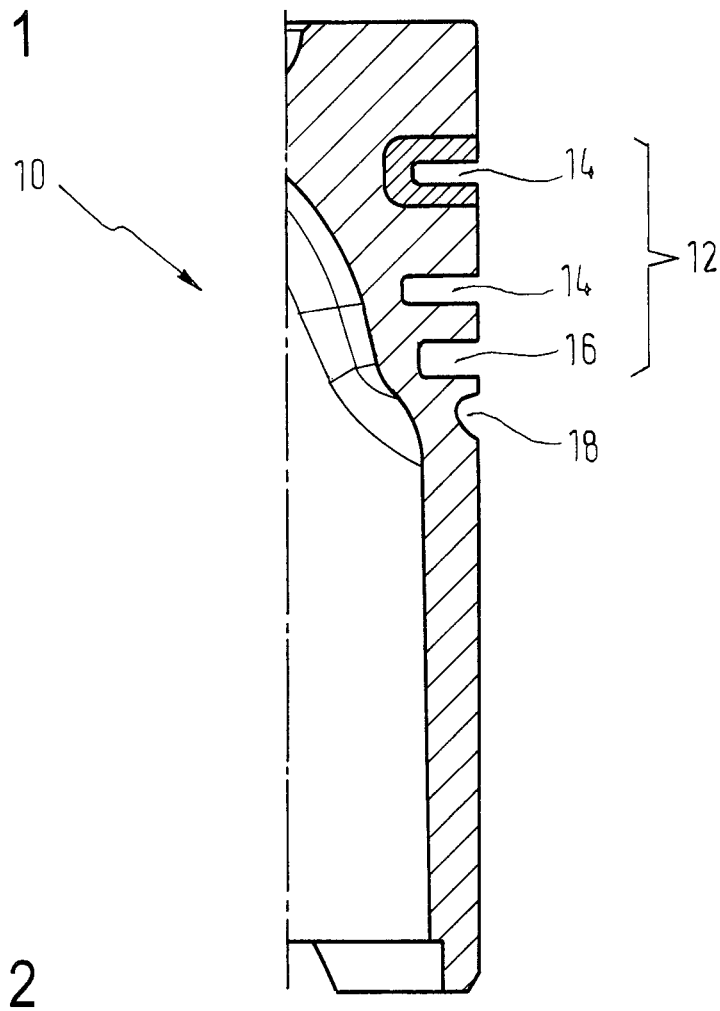
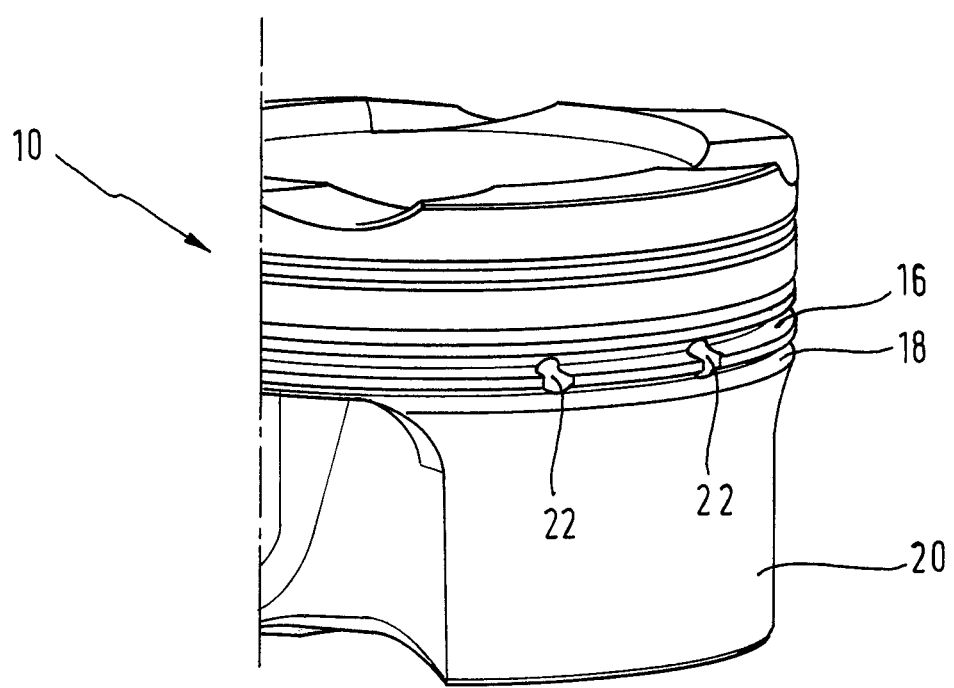

PISTON FOR AN INTERNAL COMBUSTION ENGINE

BACKGROUND

1. Technical Field

The invention relates to a piston for an internal combustion engine.

2. Related Art

Pistons for internal combustion engines usually have an oil wiper ring below, i.e. closer to, the piston pin, which wipes off the oil collecting on the cylinder wall and should return it to the crankcase. In order to discharge the oil collecting in the bottom of the groove, oil drainages are often provided which intersect the lower flank of the groove and the bottom of the groove, thus forming a channel through which the oil can run off. However, wiping off the oil is impeded in the area of the shaft walls, i.e. those sections of the outer cylinder surface which rest on the cylinder or cylinder sleeve wall during operation.

In order to wipe off as much oil as possible in this area as well, back turnings or recesses at the upper edge of the shaft and below the groove for the oil wiper ring are known. Such a recess is, for example, described in DE 10 2005 041 908 A1, which has an upper edge, i.e. closer to the piston crown, which is provided with a smaller diameter than the lower edge of the recess. This reduction of the diameter at the upper edge reduces the support surface below the oil ring and thus worsens the guidance of the oil wiper ring.

SUMMARY

Against this background, the invention is based on the object of providing a piston for an internal combustion engine, in which the wiped-off oil can be optimally discharged and at the same time good guidance of the oil wiper ring is ensured.

The piston comprises a groove for an oil wiper ring and a recess between this groove and at least one shaft wall, and is characterized in that the lower flank or edge of the groove that is closer to the shaft wall has a larger diameter than a lower edge of the recess. It should be mentioned that the piston typically has at least one, typically two, annular grooves for a compression ring above the described groove for the oil wiper ring, i.e. positioned closer to the piston crown. However, such grooves are of secondary importance for the present invention, and the groove for the oil wiper ring, typically the lowest annular groove, is therefore only referred to as a groove for the sake of simplicity.

The aforementioned recess can also be designated as a back turning or also as a groove and is configured cylindrically in the area of at least one shaft wall, preferably both shaft walls; in other words, it is essentially constant over the circumference. This allows extensive oil to be wiped off also in the area of the shaft walls and to be returned to the crankcase. The invention ensures at the same time good guidance of the oil wiper ring since the lower groove flank has a comparatively large diameter in relation to the piston stroke axis, in particular a diameter larger than that of the lower edge of the recess. Moreover, the diameter of the lower edge of the groove can be essentially the same to all edges of the compression ring grooves. In addition, the geometry according to the invention ensures good lubrication in the area of the shaft walls of the piston.

It was established in first proof-of-principle experiments that a diameter of the lower edge of the groove that is at least 0.08 mm larger leads to good results.

In order not to unnecessarily complicate the production of the piston, it is further preferred that the upper edge of the recess has a diameter substantially equal to the lower edge of the ring groove. Thus, a substantially cylindrical surface is provided between the recess and the groove.

With regard to the cross-section of the recess, an asymmetrically rounded cross-section has proven to be favorable for an extensive wiping-off of oil.

In this regard, a deepest point of the recess can be positioned closer to the upper than the lower edge of the recess.

To further support the oil discharge, at least one bore is additionally provided which intersects both the lower edge of the groove and the upper edge of the recess. This advantageously allows an oil flow from the oil wiper groove to the recess.

Particular advantages are offered here by the configuration of at least one recess as a blind hole, in other words the avoidance of a continuous bore to the inside of the piston, where a connecting rod is provided. With such continuous bores, there is the risk that oil flows from the inside of the piston to the outside, thereby increasing the oil consumption. This can be avoided by the preferred configuration of a blind hole.

Although less deep configurations of the bore are possible, it is preferred that the bore extends at least to the bottom of the annular groove in order to always ensure that there is a free flow cross-section for the oil to be discharged.

In certain applications, it has also proven to be advantageous to configure at least one bore as a through-bore. This offers the advantage of a simplified production since it is not necessary to set, and maintain in a process-reliable manner, a certain bore depth.

Although a configuration is conceivable in which the recess is configured deeper than the grooves, so that in this case it would be preferred that the bore reaches at least to the bottom of the recess, it is preferred that the groove is configured deeper than the recess. This ensures good guidance of the oil wiper ring, and a less deeply configured recess can also achieve the effects described above. The preferred embodiment of the bore at least to the bottom of the groove is associated with the last described configuration.

It has further been found to be favorable to configure the recess larger in the direction of the piston stroke axis than the groove for the oil wiper ring.

THE DRAWINGS

In the following, the invention will be described in more detail by means of one embodiment which is shown as an example. The drawings show the following:

FIG. 1 a partial section through the piston according to the invention; and

FIG. 2 a perspective view of a part of the piston according to the invention.

DETAILED DESCRIPTION

As can be seen in FIG. 1, the piston 10 according to an embodiment the invention comprises a ring zone 12 with two compression ring grooves 14 and a groove 16 for an oil wiper ring which is not shown. Below, i.e. located further away from the piston crown (in the figure above), a recess 18 is provided that is less spaced from the groove 16 in the direction of the piston stroke axis than the groove 16 from the lowest compression ring groove 14. Moreover, the recess is configured less deep than the groove 16 for the oil wiper ring. In particular, it seems sufficient if the recess 18 has less than half the depth of the groove 16. However, it is preferred that the recess 18 has a larger dimension in the direction of the piston stroke axis than the groove 16 for the oil wiper ring.

In the case shown, the recess 18 has in cross-section the shape of a rounded notch, with the deepest point being located closer to the groove 16. As can be seen, in principle, in the figure, the diameter in the area of the lower edge of the groove 18 is configured smaller than the diameter at the lower edge of the groove 16 in order to achieve here the largest possible support surface for the oil wiper ring.

In the case shown in FIG. 2, two bores 22 can be seen which serve as oil drainages and intersect both the lower edge of the groove 16 and the upper edge of the recess 18. In addition, in the case shown, the bores extend to the bottom of the groove which is configured deeper than the recess 18, and therefore an oil flow from the groove 16 to the recess 18 can be ensured. In the direction of the piston stroke axis, the bores 22 typically extend from the bottom of the groove 16 to the course of the recess 18.

The invention claimed is:

1. A piston for an internal combustion engine, comprising a groove for an oil wiper ring and a recess between the groove and at least one shaft wall, wherein a lower edge of the groove, has a larger diameter than a lower edge of the recess and wherein at least one bore is provided which intersects both the lower edge of the groove and the upper edge of the recess.

2. The piston according to claim 1, wherein the diameter in the area of the lower edge of the groove is at least 0.08 mm larger than the diameter in the area of the lower edge of the recess.

3. The piston according to claim 1, wherein the upper edge of the recess has essentially the same diameter as the lower edge of the groove.

4. The piston according to claim 1, wherein the recess has an asymmetrically rounded cross-section.

5. The piston according to claim 4, wherein the deepest position of the recess is positioned closer to the upper edge of the recess.

6. The piston according to claim 5, wherein the at least one bore is configured as a blind hole.

7. The piston according to claim 5, wherein the at least one bore extends at least to the bottom of the groove.

8. The piston according to claim 5, wherein the at least one bore is configured as a through-bore.

9. The piston according to claim 5, wherein the groove is configured deeper than the recess.

10. The piston according to claim 5, wherein the recess is configured larger in the direction of the piston stroke axis than the groove.

* * * * *